United States Patent [19]
Heubeck

[11] Patent Number: 5,805,657
[45] Date of Patent: Sep. 8, 1998

[54] NUCLEAR FUEL ELEMENTS MADE FROM NANOPHASE MATERIALS

[75] Inventor: Norman B. Heubeck, Schenectady, N.Y.

[73] Assignee: The United States of America as represented by the United States Department of Energy, Washington, D.C.

[21] Appl. No.: 900,718

[22] Filed: Jul. 28, 1997

[51] Int. Cl.[6] ......................................................... G21C 3/07
[52] U.S. Cl. ........................... 376/457; 376/427; 376/901
[58] Field of Search ..................................... 376/414, 416, 376/457, 900, 901, 430, 427, 411

[56] References Cited

U.S. PATENT DOCUMENTS 4,978,480  12/1990  Stansfield et al. ....................... 376/414
5,434,896  7/1995  Bryan et al. ............................. 376/416

OTHER PUBLICATIONS

TRG Report 2627(s)–Refel Silicone Carbide. "The Development of a Ceramic for a Nuclear Engineering Application", By: P. Kennedy & JV Shennan–Oct. 9, 1974.

"Synthesis and PRoperties of Nanophase Ceramics for Technological Applications", Proceedings of the P/M in Aerospace and Defense Technologies Symposium, John C. Parker, published by Metal Powder Industries Federation, Princeton, NJ, 1991, pp. 163–168.

*Primary Examiner*—Daniel D. Wasil
*Attorney, Agent, or Firm*—Virginia B. Caress; William R. Moser; Paul A. Gottlieb

[57] ABSTRACT

A nuclear reactor core fuel element is composed of nanophase high temperature materials. An array of the fuel elements in rod form are joined in an open geometry fuel cell that preferably also uses such nanophase materials for the cell structures. The particular high temperature nanophase fuel element material must have the appropriate mechanical characteristics to avoid strain related failure even at high temperatures, in the order of about 3000° F. Preferably, the reactor type is a pressurized or boiling water reactor and the nanophase material is a high temperature ceramic or ceramic composite. Nanophase metals, or nanophase metals with nanophase ceramics in a composite mixture, also have desirable characteristics, although their temperature capability is not as great as with all-ceramic nanophase material. Combinations of conventional or nanophase metals and conventional or nanophase ceramics can be employed as long as there is at least one nanophase material in the composite. The nuclear reactor so constructed has a number of high strength fuel particles, a nanophase structural material for supporting a fuel rod at high temperature, a configuration to allow passive cooling in the event of a primary cooling system failure, an ability to retain a coolable geometry even at high temperatures, an ability to resist generation of hydrogen gas, and a configuration having good nuclear, corrosion, and mechanical characteristics.

27 Claims, 1 Drawing Sheet

NUCLEAR FUEL ELEMENTS MADE FROM NANOPHASE MATERIALS

FIELD OF THE INVENTION

The present invention relates to nuclear reactors generally and, more particularly, to a nuclear reactor core that uses nanophase (nanostructured) ceramics, nanophase metals or nanophase composites of these materials to provide high temperature capability and a high structural support capability.

BACKGROUND OF THE INVENTION

Conventional nuclear reactors include both pressurized water reactors (PWR) or boiling water reactors (BWR). Both designs generally use Zircaloy metal for both the fuel rod cladding as well as for structural material to hold the fuel rods in place. Zircaloy was selected for this application because of its low nuclear cross section. The low nuclear cross section provides a low absorption of neutrons that cause the continuation of the fissioning process in a nuclear reactor core. Zircaloy also has better high temperature capability for normal operation than other low nuclear cross section materials, such as aluminum. Zircaloy was generally regarded as an adequate core material. However, the reactor accident at the Three Mile Island No. 2 reactor plant highlighted some of the shortcomings of Zircaloy that were known to experts in the field. The shortcomings became evident with the accident that was the result of a serious loss of cooling fluid.

During normal reactor operation, the surface temperature of the Zircaloy is approximately 650°–700° F. This causes limited surface oxidation and is accounted for in the typical reactor design. As the surface temperature increases, the oxidation rate increases. If the Zircaloy temperatures approach approximately 2000° F., which can occur during an accident, the Zircaloy reacts rapidly with the steam in the reactor in what is generally referred to as a Zirc-water reaction. The reaction results in rapid oxidation of Zircaloy and the rapid formation of hydrogen gas. The oxidized high temperature Zircaloy lacks structural strength and will slump under its own weight and release fission gases contained in the fuel rods.

The accident at Three Mile Island was the result of operators shutting off the cooling water to the reactor core while the reactor continued to heat up from the decay heat at a time after the reactor was shut down. The reactor core heat up resulted in much of the core slumping into the bottom of the reactor vessel, the generation of hydrogen gas and the detonation of the hydrogen gas. The slumping of the reactor core results in a non-coolable geometry where the core material continues to increase in temperature. A possible core melt-through of the reactor vessel was fortunately averted by the reactor operators restoring the cooling water to the reactor. New generations of water cooled reactors are being developed with large supplies of cooling water, reduced power density, and the elimination of active pumping during the first stages of a potential accident. These new generation reactors continue to use Zircaloy with its known limitations as discussed.

Gas cooled reactors have been proposed to give high temperature capability with coated fuel particles (such as TRISO fuel particles) in a graphite matrix. The TRISO particles are formed by encapsulating the nuclear fuel in ceramic layers. The TRISO particles effectively become a small pressure vessel for the fission products. The resulting high temperature fuel capability of TRISO particles has resulted in core designs that have passive methods for decay heat removal. Gas reactor systems require low power densities, large systems and the use of graphite as a moderator as well as for the structure. A graphite structure has the undesirable potential of burning when exposed to air.

The potential application of ceramics to reactors has been recognized. Certain gas reactors have been developed and built using fuel rods formed from conventional silicon carbide. One of the difficulties with using ceramics was the low limit on allowable stress and strain. Conventional ceramics are not only very brittle, which results in very little allowable strain before failure, but also have defects and inclusions which can substantially lower the nominal allowable strain. As a result, failure analysis must be performed on a statistical basis to consider the impact of the flaws. The defects and inclusions create potential initiation sites for failure. A successful attempt at the use of conventional ceramic materials in the core of a reactor has not been realized.

The recent developments of nanophase metals at the University of Saarland in Germany in the early 1980's and the development of nanophase ceramics at Argonne National Laboratory in the mid 1980's have provided materials with potentially better mechanical properties than were formerly available.

Nanophase (sometimes referred to as nanostructured) materials are made from extremely small grains less than 50 nanometers ($50 \times 10^{-9}$m) in diameter compared to conventional grain sizes of 1 to 100 micrometers (1 to $100 \times 10^{-6}$m). Nanophase materials can be made from a single material or composites of different materials. Nanophase ceramics would tend to have the best high temperature performance.

SUMMARY OF THE INVENTION

In accordance with the invention, a nuclear core would include reactor fuel elements composed of nanophase high temperature materials joined in a cell that could also use nanophase high temperature materials for the cell structures. The particular high temperature nanophase material used for the fuel element must have the appropriate mechanical characteristics to avoid strain related failure. The fuel elements would be in rod form in an open geometry (i.e., not separate fluid channels) to encourage a great deal of fluid mixing.

In the preferred embodiment, the reactor type would be a pressurized or boiling water reactor and the nanophase material would be a high temperature ceramic or ceramic composite. Nanophase metals, or nanophase metals with nanophase ceramics in a composite mixture, are expected to have desirable characteristics, although the temperature capability would not be as great as with all ceramics. The invention also pertains to any combinations of conventional or nanophase metals and conventional or nanophase ceramics, as long as there is at least one nanophase material in the composite.

Objects, features and advantages of the present invention include providing a nuclear reactor having a number of high strength fuel particles, a structural material for supporting a fuel rod, a high temperature capability, a configuration to allow passive cooling in the event of a primary cooling system failure, an ability to retain a coolable geometry even at high temperatures, an ability to resist generation of hydrogen gas, and a configuration having good nuclear, corrosion and mechanical characteristics.

BRIEF DESCRIPTION OF THE DRAWINGS

These and other objects, features and advantages of the present invention will be apparent from the following detailed description and the appended drawings in which.

DETAILED DESCRIPTION OF THE PREFERRED EMBODIMENT

Figure 1:
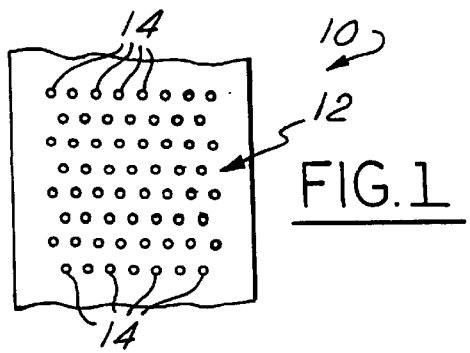
FIG. 1 is a schematic fragmentary view of a first embodiment fuel rod with TRISO uranium fuel particles in a nanophase ceramic matrix.

Referring to FIG. 1, a fuel rod 10 according to a preferred embodiment of the present invention is shown. The fuel rod 10 generally comprises a matrix 12 and a number of fuel particles 14. The matrix 12 is generally made of a nanophase material (i.e., grain size of less than $50 \times 10^{-9}$m). Such nanophase materials include, but are not limited to, nanophase silicon carbide, nanophase silicon nitride and nanophase zirconium carbide or composites thereof. The nanophase material may also include any combinations of conventional or nanophase metals, such as nanophase palladium, and conventional or nanophase ceramics, as long as there is at least one nanophase material. The fuel particles 14 may be TRISO fuel particles which are known in the art to have applications in high temperature gas reactors. In general, the TRISO particles are formed by encapsulating a nuclear fuel (e.g., uranium) kernel with various layers of pyrolytic carbon and silicon carbide. The TRISO particles form an effective pressure vessel that contains the fission products that result from the fissioning process used to produce energy in a nuclear reactor. Using the matrix material 12 from a nanophase ceramic provides the advantage of having an added mechanical strength to the fuel particles 14 and provides a structural material for the support of the fuel rod 10. A nanophase ceramic may be used to form the matrix 12 since it has a high strain capability when compared to conventional ceramics. A nanophase cladding may be added surrounding the matrix and the nanophase matrix ceramic and nanophase cladding ceramic are then bonded together to form an integral fuel rod. A bonded cladding is not needed if there is enough matrix material on the outer edge to give support. The strain capability of nanophase ceramics is discussed in more detail with regard to FIG. 5. Essentially, a nanophase ceramic has a finer grain structure, which introduces smaller flaws, which generally results in higher allowable strains before failure.

The selection of an appropriate nanophase ceramic to implement the matrix 12 depends on the thermal conductivity, thermal expansion coefficient, strain and stress capability, nuclear cross section, growth in a radiation field and corrosion characteristics needed for a particular design application. Additional advantages of the use of nanophase ceramics are that nanophase ceramics may more easily be formed into parts without the use of sintering aids. Sintering aids tend to concentrate in the grain boundaries which have been considered a cause of increased corrosion in ceramics, which is undesirable. Nanophase silicon carbide is one example of an acceptable material due to its low nuclear cross section as well as other desirable properties such as low thermal expansion coefficient and low growth in a nuclear field. Other materials that may be used to implement the fuel rod 10 include nanophase silicon nitride, nanophase zirconium carbide, or some other type of ceramic such as oxide ceramic. The fuel rod of FIG. 1 may be used in gas-cooled or water-cooled nuclear reactors.

Figure 2:
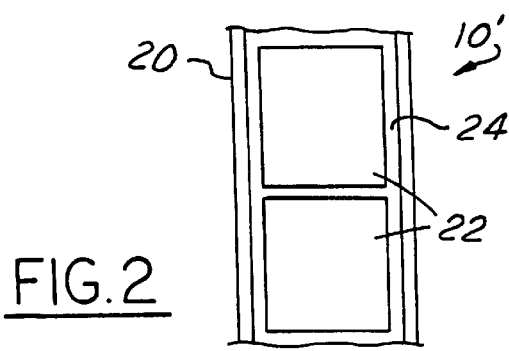
FIG. 2 is a fragmentary schematic view of a second embodiment fuel rod comprised of conventional fuel pellets in a nanophase cladding.

Referring to FIG. 2, an alternate embodiment fuel rod 10' is shown as being adapted for use in a conventional type existing reactor, such as a water cooled reactor. The fuel rod 10' generally comprises a nanophase cladding 20, a fuel pellet 22 and a gas gap 24. The cladding 20 is separated from the fuel pellet 22 by the gas gap 24, in what is referred to as an unbonded-cladding fuel rod. The cladding 20 may be implemented as a thin nanophase cladding. The fuel pellet 22 may be implemented as a conventional uranium oxide fuel pellet, i.e., uranium oxide pressed into a pellet form (not TRISO). As a result, the advantages discussed in regard to FIG. 1 may be realized in an application involving a conventional type of water-cooled reactor.

Figure 3:
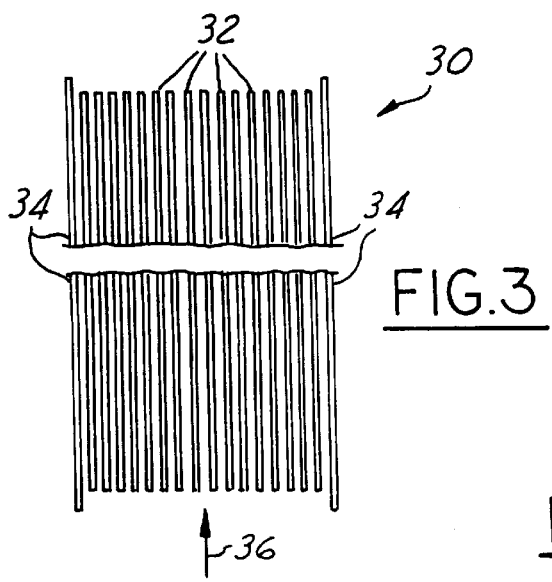
FIG. 3 is a fragmentary schematic view of an array of nanophase fuel rods located within a fuel cell of the present invention with the fuel rods oriented in an array with their longitudinal axes parallel to the direction of reactor fluid flow.

Referring to FIG. 3, a fuel cell 30 is shown. The fuel cell 30 generally is comprised of a number of fuel rods 32 and a cell structure 34. The fuel rods 32 may be formed from a nanophase material as discussed with regard to FIG. 1 or FIG. 2. The fuel rods 32 are generally located within the cell structure 34. The combination of the fuel rods 32 and the cell structure 34 forms the fuel cell 30. The cell structure 34 (e.g., side walls) may be made of nanophase material which may be the same material as the fuel rods 32, thus simplifying the design and manufacturing of the fuel cell 30 while maintaining high temperature capability hardware. The cell structure 34 generally surrounds and supports the fuel rods 32. Another option for implementing the cell structure 34 is to use composite materials to improve the shock resistance, or toughness, of the cell walls. However, this implementation would be at the expense of introducing different manufacturing techniques and materials. The direction of the reactor fluid flow is generally parallel to the longitudinal axes of the fuel rods as indicated by the arrow 36.

Figure 4:
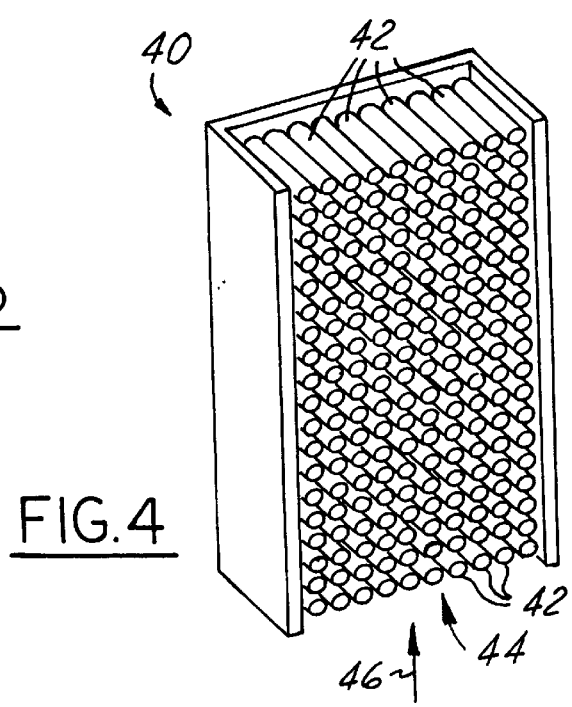
FIG. 4 is a fragmentary perspective sectional view of an alternate embodiment of a fuel cell of the present invention with the array of fuel rods oriented with their longitudinal axes perpendicular to the direction of reactor fluid flow.

Referring to FIG. 4, an alternate fuel cell configuration 40 is shown. A number of fuel rods 42 are positioned inside a cell structure 44 with the longitudinal axes of rods 42 oriented in a generally perpendicular fashion to the direction of the reactor fluid flow. The cell structure 44, such as its side walls, can also be made of nanophase material. The direction of the reactor fluid flow is shown generally by the arrow 46. By configuring the fuel rods 42 in a generally perpendicular fashion with respect to the reactor fluid flow, an increase in the reactor coolant mixing is realized. This coolant mixing increase is especially noticeable if the fuel rods 42 are staggered. The increase in coolant mixing realized by staggering the fuel rods 42 may cause an increase in pressure drop in the reactor flow when compared to the fuel cell 30. However, this increased pressure drop may be acceptable when implementing a particular reactor design.

The fuel cell 30 or the fuel cell 40 both use an open geometry allowing extensive mixing of the reactor coolant to remove heat from the fuel rods 32 or 42. When water is used as the reactor coolant, overheating situations may result in steam voids being formed between the individual fuel rods. These voids result in a reduction of surface heat transfer between the surface of the fuel rods and the coolant. This may result in a rapid excursion of the fuel rod temperature. This rapid increase in fuel rod temperature is generally known in the art as critical heat flux. With conventional fuel rods that use Zircaloy, overheating during a critical heat flux may be catastrophic. As the surface temperature increases, the Zircaloy reacts with the steam in the reactor which results in oxidation of the Zircaloy and the formation of hydrogen gas. The oxidized Zircaloy lacks structural strength and will slump under its own weight and release fission products contained in the fuel rods. Thus, critical heat flux may be catastrophic in reactors that use Zircaloy fuel rods.

However, reactors that use nanophase ceramic materials for fuel rods in accordance with the present invention would be less sensitive to critical heat flux because such ceramic material rods will maintain their structural integrity during high temperatures. The increased safety thus resulting from using nanophase ceramic material permits the reactor to operate at a higher operating temperature. The higher operating temperature in turn results in higher thermal efficiency for the reactor system. By contrast, to preclude the catastrophic results from overheating the fuel, prior art reactors that use Zircaloy must operate at lower temperatures and efficiency to maintain large thermal margins between operating conditions and possible accident conditions.

In a water cooled reactor, the water between the fuel rods acts as a neutron moderator to slow down the fast neutrons to permit the continuation of the fission process. The formation of steam voids during overheating situations reduces the moderator effect of the water. This reduction tends to suppress the local power generation and overall nuclear core reactivity. This effect is referred to as the void coefficient. As stated above, the formation of steam voids may be catastrophic in reactors that use Zircaloy fuel rods. However, when high temperature ceramic fuel rods are used in accordance with the invention, the formation of steam and the resultant void coefficient effect provides an inherent safety mechanism that causes self-shutdown of the reactor.

Implementing the fuel cell 30 and the fuel cell 40 according to the present invention allows the possibility of passive decay heat removal. This results from the high temperature capability of the fuel rods 42 so that they retain their structural integrity at high temperatures. Thus fuel cells 30 and 40 have sufficient strength to continue to maintain their original assembly array orientation and hence continue to provide a convection path of decay heat removal between the fuel elements 42 and the reactor vessel under such conditions. Ceramic fuel elements are expected to have temperature capabilities of above 3000° F., where Zircaloy fuel elements would lose all effective strength and slump to the bottom of the reactor vessel in a non-coolable geometry. The required power density of the core for passive decay heat removal with ceramics becomes a function of the particular design requirements by providing fuel rods 42 that maintain their shape during high temperatures. This allows for coolant to continue to pass even with such high temperatures. If passive decay heat removal were required to prevent core damage, a low power density would have to be used. The material used to implement the fuel rods 42 and the cell structure 44 may be designed accordingly. A high power density may be permitted if the core and vessel can be replaced after an incident while maintaining the preclusion of significant fission product release. The application of ceramic fuel rods 42 to water reactors may permit the continued use of the well known light water nuclear technology with the added safety benefit of the passive decay heat removal capability realized in gas cooled reactors.

The primary application of nanophase ceramics is considered to be water reactors because of their installed user base. The present invention may also be applicable to gas reactors using a gas such as helium as a coolant, due to the high temperature, high stress-strain capability needed for gas applications.

Figure 5:
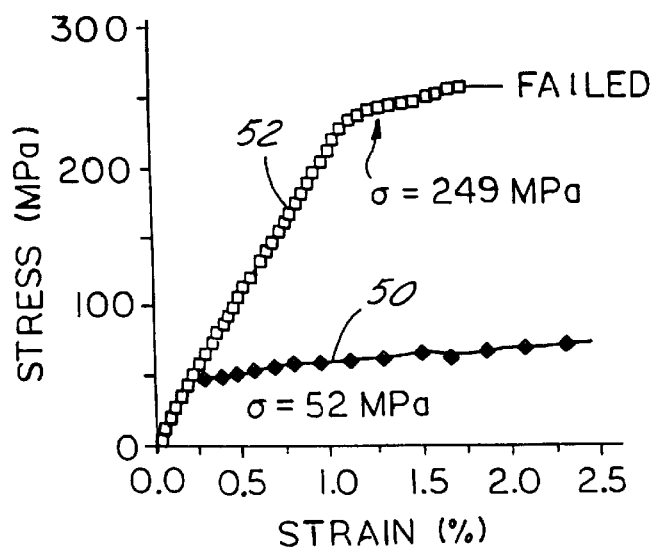
FIG. 5 is a graphical representation of a comparison between the stress-strain of nanophase versus coarse grained palladium.

Referring to FIG. 5, a graphical representation of a comparison between the stress-strain of nanophase (5 nanometer) versus coarse grain (100 micrometer) palladium is shown. A first curve 50 is shown generally representing coarse grain palladium while a second curve 52 is generally shown representing nanophase palladium. The coarse grain palladium particle size is generally 100 micrometer while the nanophase palladium particle size is 5 nanometer.

While the invention has been particularly shown and described with reference to the preferred embodiments thereof, it will be understood by those skilled in the art that various changes in form and details may be made without departing from the spirit and scope of the invention.

I claim:

1. In a nuclear reactor core, of the type for use in a nuclear reactor system having a plurality of reactor fuel cells in a reactor vessel containing a coolant fluid for flow therethrough, said reactor fuel cells each comprising a plurality of elongated fuel rods supported in said fuel cell in a mutually spaced apart array and oriented with the longitudinal axes of said fuel rods generally parallel to one another for circulation of said coolant fluid around and about said rods in said fuel cells, and nuclear fuel comprising nuclear fuel material, such as uranium, contained within each of said fuel rods; the improvement in combination therewith comprising nanophase structural supporting material for said nuclear fuel, such nanophase material being selected, constructed, and arranged to contain and support said fuel in the associated fuel rod, to provide structural integrity and self-supporting capability of said fuel rods in their array orientation in said fuel cell, and to be non-reactive with said coolant fluid.

2. The nuclear core according to claim 1 wherein said nanophase supporting material is selected from the group consisting of a single nanophase ceramic, a single nanophase metal, a composite of different ceramics, a composite of different metals, and a composite of ceramic and metal, wherein said composites are composed of at least one nanophase material.

3. The nuclear core according to claim 1 wherein said nanophase supporting material comprises nanophase silicon carbide.

4. The nuclear core according to claim 1 wherein said nanophase supporting material is selected from the group consisting of nanophase silicon carbide, nanophase silicon nitride and nanophase zirconium carbide.

5. The nuclear core according to claim 1 wherein said fuel rods, said fuel and said structural components are selected, constructed and arranged to maintain a maximum reactor core outlet temperature, core temperature rise and secondary steam pressure to maximize overall system efficiency.

6. The nuclear core according to claim 1 wherein said fuel rods are supported and arranged in their reactor fuel cell array in an open geometry to thereby provide inherent reactor safety by maintaining the structural integrity and shape of said rods and their array orientation.

7. The nuclear core according to claim 6 wherein the fuel rod array in said nuclear reactor core is oriented by geometric assembly design to provide passive decay heat removal by maintaining the initial shape of said fuel rods and their assembly orientation in said array both during critical heat flux and decay cool down.

8. The nuclear core according to claim 1 wherein said fuel rods are arranged with their longitudinal axes generally parallel to the direction of flow of the cooling fluid through said fuel cells.

9. The nuclear core according to claim 1 wherein said fuel rods are arranged with their longitudinal axes generally perpendicular to the direction of flow of the cooling fluid through said fuel cells.

10. The nuclear core according to claim 9 wherein said fuel rods are staggered in said fuel cells with respect to the direction of flow of the cooling fluid through said fuel cells.

11. The nuclear core according to claim 1 wherein the coolant fluid is water to thereby provide inherent reactivity self-shutdown due to the capability of said fuel rods to tolerate steam void formation and critical heat flux.

12. The nuclear core according to claim 1 wherein the coolant fluid is a gas.

13. The nuclear core according to claim 12 wherein said gas comprises helium.

14. The nuclear core according to claim 1 wherein said fuel comprises fuel pellets and said nanophase structural supporting material for said fuel comprises a cladding formed from a nanophase ceramic material and encompassing said fuel pellets with a gas gap interposed therebetween.

15. The nuclear core according to claim 1 wherein said nanophase material is selected and constructed to provide containment and support for said fuel, and to provide fuel rod self-supporting capability, up to temperatures of about 3000° F.

16. The nuclear core according to claim 1 wherein said nuclear fuel comprises particles, and said nanophase supporting structural material comprises nanophase matrix material in which said particles are embedded.

17. The nuclear core according to claim 1 wherein said nuclear fuel comprises particles, said nanophase structural supporting material comprises nanophase matrix material in which said particles are embedded, and further comprising a nanophase cladding bonded to said matrix material.

18. The nuclear core according to claim 1 wherein said nanophase structural supporting material for said fuel comprises a nanophase matrix material bonded to a cladding structure, said cladding structure formed from a nanophase ceramic material; wherein said fuel comprises particles embedded within said matrix material to enable said particles to retain a fission gas; and wherein said reactor fuel cell comprises a cell wall structure composed of a nanophase ceramic material operable for surrounding and supporting said fuel rods.

19. The nuclear core according to claim 18 wherein said fuel particles comprise one or more TRISO coated fuel particles embedded within said matrix material of said fuel rods and wherein said particles are capable of retaining a fission gas.

20. A nuclear fuel cell for use in a nuclear reactor core in a nuclear reactor system of the type having an interior reactor chamber adapted to contain a coolant fluid for flow therethrough, said cell comprising cell walls made of nanophase material and a plurality of fuel rods within said cell walls in a mutually spaced apart array and oriented with the longitudinal axes of said fuel rods generally parallel to one another for circulation of the coolant fluid around and about said rods in said cell; said fuel rods comprising nuclear fuel material, such as uranium, and nanophase structural supporting material for said nuclear fuel selected, constructed and arranged to contain and support said fuel in the associated said fuel rod, to give structural integrity and self-supporting capability to said fuel rods in their array orientation in said cell, and to be non-reactive with said coolant fluid.

21. The fuel cell according to claim 20 wherein said nanophase material for said cell walls and said nanophase supporting material for said fuel are selected from the group consisting of a single nanophase ceramic, a single nanophase metal, a composite of different ceramics, a composite of different metals, and a composite of ceramic and metal, wherein said composites are composed of at least one nanophase material.

22. The fuel cell according to claim 20 wherein said nanophase supporting material for said fuel comprises nanophase silicon carbide.

23. The fuel cell according to claim 20 wherein said nanophase supporting material is selected from the group consisting of nanophase silicon carbide, nanophase silicon nitride and nanophase zirconium carbide.

24. The fuel cell according to claim 20 wherein said nanophase structural supporting material in said fuel rods comprises a nanophase matrix material, and said fuel comprises nuclear fuel particles embedded in said matrix.

25. The fuel cell according to claim 24 wherein said fuel particles comprise one or more TRISO coated fuel particles and wherein said particles are capable of retaining a fission gas.

26. The fuel cell according to claim 24 wherein said fuel rod further comprises a nanophase material cladding surrounding and bonded to said matrix material.

27. The fuel cell according to claim 20 wherein said nuclear fuel comprises nuclear fuel pellets, and said nanophase structural supporting material comprises a nanophase ceramic material cladding encompassing said fuel pellets, with a gas gap interposed therebetween.

* * * * *